United States Patent
Thucanakkenpalayam Sundararajan

(10) Patent No.: US 11,928,024 B1
(45) Date of Patent: Mar. 12, 2024

(54) ATOMIC CORRECTION OF SINGLE BIT ERRORS WITHIN A MEMORY

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/896,971

(22) Filed: Aug. 26, 2022

(51) Int. Cl.
*G06F 11/10* (2006.01)
(52) U.S. Cl.
CPC ................. *G06F 11/1064* (2013.01)
(58) Field of Classification Search
CPC .................................................. G06F 11/1064
See application file for complete search history.

(56) References Cited

U.S. PATENT DOCUMENTS

| | | | | |
|---|---|---|---|---|
| 2007/0288698 | A1* | 12/2007 | Hillier, III | G06F 11/106 711/141 |
| 2011/0320907 | A1* | 12/2011 | Takehara | G06F 11/10 714/753 |
| 2012/0254698 | A1* | 10/2012 | Ozer | G06F 11/106 714/764 |

\* cited by examiner

*Primary Examiner* — Thien Nguyen
(74) *Attorney, Agent, or Firm* — Patterson + Sheridan, LLP

(57) ABSTRACT

A system and method corrects single bit errors in a memory by detecting a single bit error with a memory. The memory is accessed via data cache stages of a pipeline. Further, based on detecting the single bit error, the data cache stages of the pipeline are stopped from accepting new transactions. A value associated with each address of the memory is read based on stopping the new transactions from being accepted, and the detected single bit errors within the values are corrected.

20 Claims, 4 Drawing Sheets

FIG. 2

ATOMIC CORRECTION OF SINGLE BIT ERRORS WITHIN A MEMORY

TECHNICAL FIELD

The present disclosure relates to detecting and correcting single bit errors within a memory.

BACKGROUND

Single bit and double bit errors can occur within a memory. Early detection and correction of a single bit error or errors in memory prevents a single bit error from migrating into a double bit error. When single bit errors occurs, many operating cycles are used to correct the error back to the initial stage (e.g., before the error occurred). Accordingly, dedicated error correcting hardware is used within a processing system to correct the single bit errors. The dedicated hardware tracks the address associated with the single bit error, and then corrects the single bit error at the address.

SUMMARY

In one example, a method includes detecting a single bit error with a memory. The memory is accessed via data cache stages of a pipeline. Further, the method includes stopping, based on detecting the single bit error, the data cache stages of the pipeline from accepting new transactions. The method further includes reading, based on stopping the new transactions from being accepted, a value associated with each address of the memory, and correcting detected single bit errors within the values.

In one example, a processing system includes a memory, a processor that access the memory via transactions, and a pipeline that includes data cache stages that execute the transactions to access the memory. Further, the processing system includes atomic scrubber circuitry that detects a single bit error with the memory, and reads, during a first period, a value associated with each address of the memory. The atomic scrubber circuitry further corrects detected single bit errors within the values. The processing system further incudes memory management unit circuitry that stops, based on detecting the single bit error, the data cache stages during the first period.

In one example, atomic scrubber circuitry detects a single bit error with a memory. The memory is accessed via data access cache stages of a pipeline of a processor. The atomic scrubber circuitry further reads a value associated with each address of the memory during a first period. During the first period new transactions are stopped from being accepted by the data access stages. Further, the atomic scrubber circuitry corrects detected single bit errors within the values during the first period.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 illustrates a pipeline of an example processing system, according to one or more examples.

DETAILED DESCRIPTION

Aspects of the present disclosure relate to atomic correction of single bit errors in a memory.

When a processor accesses a memory (e.g., a cache memory, or the like) single bit errors and double bit errors may occur within the memory. Single bit errors are detected and corrected to ensure that the correct values are within the memory. In some instances, a processing system includes dedicated hardware that is used to detect and correct single bit errors. The dedicated hardware tracks the address associated with the single bit error, and then corrects the single bit error at the address. As the dedicated hardware tracks the address associated with the single bit error, the memory requirements associated with the dedicated hardware increases the design complexity of the processing system, circuit area, and power requirements of the processing system. Accordingly, the manufacturing costs of the processing system are increased.

The processing system described herein includes atomic scrubbing circuitry that is configured to detect and correct signal bit errors to prevent the migration of single bit errors into double bit errors. In one example, the period of time between which a single bit error occurs and the atomic scrubbing circuitry detects and corrects the single bit error is short enough such that the single bit error does not migrate into a double bit error. The atomic scrubbing circuitry as described herein analyzes each bit of the memory to detect the single bit errors. Accordingly, the atomic scrubbing circuitry does not track the address associated with the error, which reduces the memory requirements and circuit complexity of the atomic scrubbing circuitry. The atomic scrubbing circuitry as described herein detects single bit errors within a memory, and analyzes each address of the memory based on the detection of a single bit error. The atomic scrubbing circuitry analyzes each address for single bit errors during a period overlapping with when the data cache stages of a pipeline are stalled (e.g., stopped from receiving transactions).

Technical advantages of the present disclosure include, but are not limited to using atomic scrubbing circuitry to detect and correct errors within a memory. The atomic scrubbing circuitry as described herein has less memory requirements, circuit complexity, and circuit area as compared to conventional hardware solutions for correcting single bit errors. Accordingly, the atomic scrubbing circuitry as described herein reduces the manufacturing costs of the corresponding processing system.

Figure 1:
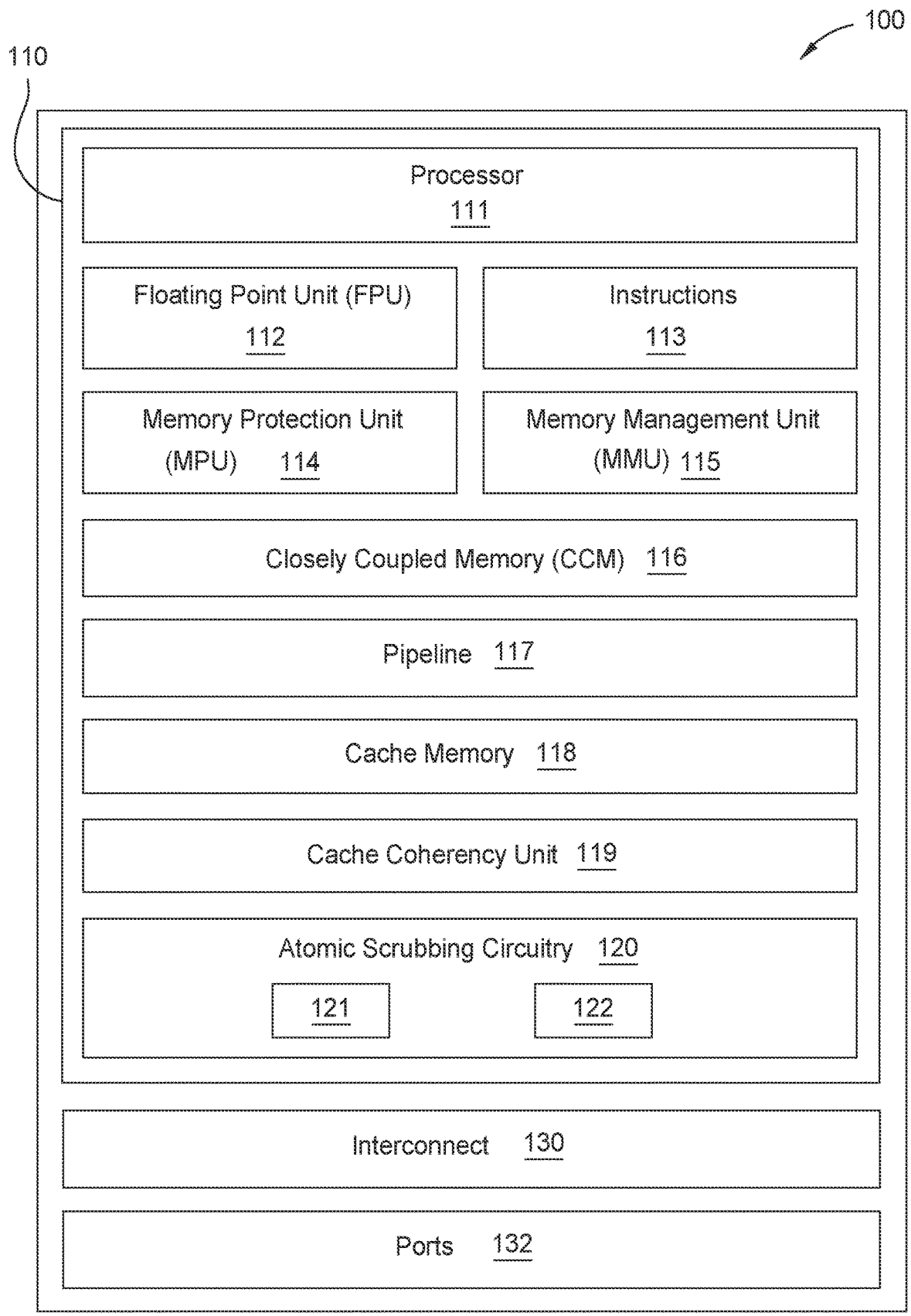
FIG. 1 illustrates an example processing system, according to one or more examples.

FIG. 1 illustrates a processing system 100, according to one or more examples. The processing system 100 includes one or more integrated circuit (IC) chips. In one example, the processing system 100 includes one or more field programmable gate arrays (FPGAs) and/or application specific ICs (ASICS), among others. In one example, the processing system 100 is a system on chip (SoC).

The processing system 100 includes a core 110. In one example, the processing system 100 includes two or more cores 110. The core 110 includes processor 111. In one example, the processor 111 is a central processing unit (CPU). In another example, the processor 111 is a 32-bit or a 64-bit reduced instruction set computer (RISC) processor. In other examples, other types of processors may be used. The processor 111 may be configured similar to the processing system 402 of FIG. 4.

The core 110 further includes a floating point unit (FPU) circuitry 112. The FPU circuitry 112 performs one or more operations on floating point numbers. For example, the FPU circuitry 112 performs one or more of addition, subtraction, multiplication, division, and/or square root operations, among others.

Further, the core 110 includes instructions 113. The instructions 113 correspond to one or more applications to be performed by the processor 111. In one example, the instructions 113 include transaction control statements configured to be performed by the processor 111.

The core 110 includes a memory protection unit (MPU) circuitry 114. The MPU circuitry 114 performs memory protection functions. For example, the MPU circuitry 114 performs memory protection functions for a cache memory (e.g., the cache memory 118). The MPU circuitry 114 monitors transactions, including instruction fetches and data accesses from the processor 111. The MPU circuitry 114 detects access violations and triggers memory fault exceptions.

The core 110 includes a memory management unit (MMU) circuitry 115. The MMU circuitry 115 handles memory requests made by the processor 111. In one example, the MMU circuitry 115 performs translations of virtual memory addresses to physical addresses. Further, the MMU circuitry 115 controls transactions provided to a cache memory (e.g., the cache memory 118), bus arbitration and/or memory bank switching.

The core 110 includes closely coupled memory (CCM) 116. The CCM 116 is mapped into a physical memory space and has a base address that is configurable. The CCM 116 has a direct memory interface that provides burst read and write memory operations for the processor 111. In one example, the CCM 116 is a random access memory (RAM). Further, the CCM 116 may be an instruction CCM for code instruction references and/or a data CCM for data references.

The core 110 includes pipeline 117. The pipeline 117 includes one or more stages. In one example, the pipeline 117 includes 10 stages. In one example, the pipeline 117 includes one or more stages directed to fetching instructions (e.g., fetch stages). During the fetch stages, instructions are fetched from a memory. Further, the pipeline 117 includes one or more decode stages. During the decode stages, the instructions are decoded. Further, the pipeline 117 includes one or more issue stages, during which, register read instructions are issued. The pipeline 117 further includes one or more execute stages. During the execute stages, the operations associated with the instructions are performed. The execute stages include one or more shift stages, one or more arithmetic-logic unit (ALU) stages, one or more branch prediction stages, one or more operand forwarding stages, and one or more commit stages. The pipeline 117 further includes one or more writeback stages. During the writeback stages, data is written to a memory. In one more examples, the pipeline 117 includes one or more data cache stages. During the data cache stages, a data cache memory is accessed.

Figure 2:
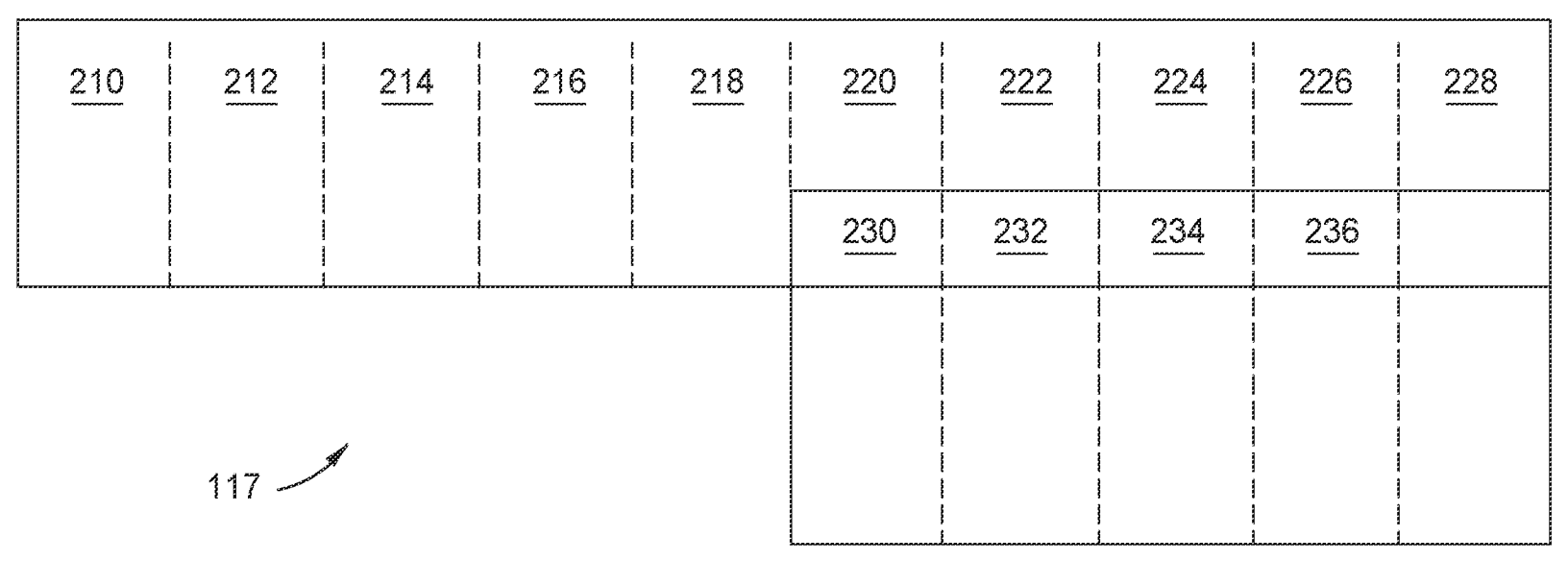

FIG. 2 illustrates an example of the pipeline 117. As illustrated in FIG. 2, the pipeline 117 is a ten stage pipeline and includes fetch stages 210, 212, and 214, decode stage 216 and issue stage 218. Further, as illustrated in FIG. 2, the pipeline 117 includes execute stages 220, 222, 224, and 226, writeback stage 228, and data cache stages 230, 232, 234, and 236. The data cache stages 230, 232, 234, and 236 are parallel to the execute stages 220, 222, 224, and 226. Accordingly, the data cache stages 230, 232, 234, and 236 are performed during a period that overlaps with a period during which the execute stages 220, 222, 224, and 226 are performed. In one example, the execute stage 220 is performed in parallel with the data cache stage 230, the execute stage 222 is performed in parallel with the data cache stage 232, the execute stage 224 is performed in parallel with the data cache stage 234, and the execute stage 225 is performed in parallel with the data cache stage 236.

In one example, the MMU circuitry 115 controls the loading of transactions into the data cache stages 230-236. The MMU circuitry 115 may stall the data cache stages 230-236. Stalling the data cache stages 230-236 stops the operations of the data cache stages 230-236 and stops the data cache stages from being loaded into the data cache stages. In one or more examples, the MMU circuitry 115 stalls the data cache stages 230-236 based on a determination that the data cache stages 230-236 are free from transactions. For example, the MMU circuitry 115 determines that the data cache stages 230-236 are free from transactions, and stalls the data cache stages 230-236.

With further reference to FIG. 1, the core 110 further includes a cache memory 118. The cache memory 118 is one or more of an instruction cache memory and a data cache memory. The cache memory 118 may be a level one cache memory. In one example, the cache memory 118 is shared among multiple different cores.

The core 110 includes a cache coherency unit 119. The cache coherency unit 119 provides input/output coherency between the cache memory 118 and the processor 111. In one example, the cache coherency unit 119 includes an interconnect and controller to ensure consistency of shared data within the cache memory 118.

The core includes atomic scrubber circuitry 120. The atomic scrubber circuitry 120 scrubs one or more addresses within the cache memory 118 and/or a datapath when errors are detected. In one example, memory scrubbing includes reading the memory address of the cache memory 118, detecting single bit errors, correcting (e.g., fixing) detected errors within the cache memory 118, and writing corrected data back to cache memory 118.

In one example, the atomic scrubber circuitry 120 includes error-correcting code (ECC) circuitry 121. The ECC circuitry 121 performs an error correction and detection process on the cache memory 118 and/or datapath. In one example, the processor 111 reads and writes data to the cache memory 118. The processor 111 accesses memory addresses (e.g., address registers) within the cache memory 118 to read and/or write data to the cache memory 118. The ECC circuitry 121 performs error detection on the cache memory 118 to detect single bit errors within the cache memory 118.

The atomic scrubber circuitry 120 further includes read and write circuitry 122. The read and write circuitry 122 reads a value associated with an address of the cache memory 118 and writes to the address of the cache memory 118. The read and write circuitry 122 reads values from an address, and the values are then used by the ECC circuitry 121 for error detection.

In one example, single bit errors are detected and corrected within the memory to avoid the migration of a single bit error into a double bit error. When a single bit error is detected, a memory address is scrubbed by reading the values from each memory address and correcting each single bit error detected, and writing the corrected data back to the memory address associated with the detected single bit error. In one example, single bit error correction and double bit error detection (SECDED) process is used to detect errors. In a SECDED process, a hamming distance is used to detect and correct errors within memory. The SECDED process detects and correct single bit errors and detects double bit errors. Double bit errors are not corrected by the SECDED process.

In one example, the processing system 100 further includes interconnect 130. The interconnect 130 is connected to the core 110 and the ports 132. The interconnect 130 includes one or more connections and/or one or more switches that connect the core 110 with the ports 132. The interconnect 130 may be a programmable interconnect or a non-programmable (e.g., hard-wired) interconnect. The ports 132 provide a communication pathway with devices external to the processing system 100.

In one example, the processor 111 accesses memory addresses within the cache memory 118. For example, data is transferred from or to the cache memory 118 based on data cache stages (e.g., the data cache stages 230, 232, 234, and 236) of the pipeline 117. Each data cache stage performs one operation at a time. During the memory access process, errors may be detected within the data path or memory bank being accessed. In one example, based on the detection of the errors, a memory scrubbing process is performed to correct the detected errors. The accessed memory address is pipelined across the data cache stages of the pipeline 117. In one example, for 32 memory banks, the address is pipelined across two data cache stages (or more) of the pipeline 117. In such an example, there are 16 bits per memory address. Accordingly, 1024 bits of registers are used to store the memory address during the data correction process. However, storing the memory address is memory requirement intensive, increasing the memory requirements of the memory scrubbing processes.

Figure 3:
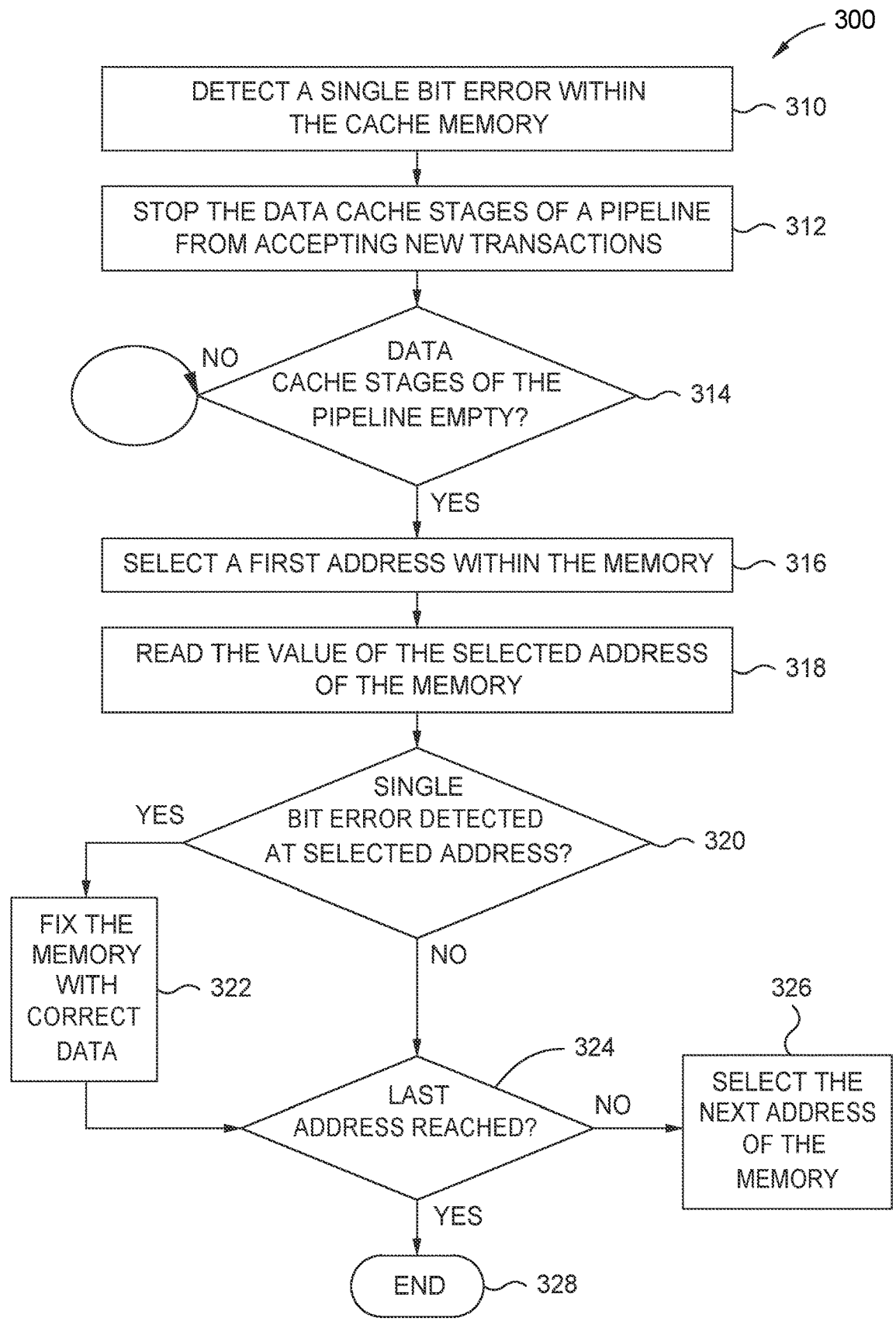
FIG. 3 is a flowchart of a method for correcting single bit errors, according to one or more examples.

FIG. 3 illustrates a flowchart of a method 300 for performing memory scrubbing with the atomic scrubber circuitry 120, according to one or more examples. The method 300 is performed by the processing system 100. The method 300 is described with reference to FIG. 1 and FIG. 2. In one example, the method 300 performs error detection and correction for each memory address of a memory (e.g., the cache memory 118). Accordingly, the method 300 may detect and correct multiple signal bit errors within the memory addresses of the memory.

At 310 of the method 300, a single bit error is detected within the cache memory. For example, the ECC circuitry 121 detects a single bit error within the cache memory 118. In one example, the ECC circuitry 121 detects a single bit error within the cache memory 118 when the processor 111 is accessing (e.g., transferring data to or receive data from) the cache memory 118. In one example, the address associated with the detected single bit error is not stored. The ECC circuitry 121 provides an indication (e.g., signal) to the MMU circuitry 115 that a single bit error has been detected. In one example, the ECC circuitry 121 does not store (save), or provide an indication to store the address associated detected single bit error.

At 312 of the method 300, the data cache stages of a pipeline stops accepting transactions. For example, the MMU circuitry 115 stops the data cache stages 230, 232, 234, and 236 of the pipeline 117 from receiving new transactions. In one example, the MMU circuitry 115 receives an indication (e.g., signal) from the ECC circuitry 121 that a single bit error has occurred. Based on receiving the indication, the MMU circuitry 115 stops the data cache stages 230, 232, 234, and 236 of the pipeline 117 from receiving new transaction. In one example, the MMU circuitry 115 stops new transactions from being received by stalling the data cache stages of the pipeline 117. For example, with reference to FIG. 2, the MMU circuitry 115 stalls the data cache stage 230. Stalling the data cache stage 230, prevents the data cache stages 230, 232, 234, and 236 from receiving new transactions from the processor 111. In one example, stalling the data cache stages 230, 232, 234, and 236, stalls the execute stages 220, 222, 224, and 226, stalling the pipeline 117.

At 314 of the method 300, a determination as to whether or not the data cache stages of the pipeline are empty is made. In one example, the processor 111 determines whether or not the data cache stages 230, 232, 234, and 236 of the pipeline 117 are empty of transactions. The processor 111 outputs a signal to the atomic scrubber circuitry 120 indicating that the data cache stages 230, 232, 234, and 236 are empty of transactions. In another example, the MMU circuitry 115 determines whether or not the data cache stages 230, 232, 234, and 236 of the pipeline 117 are empty of transactions. In such an example, the MMU circuitry 115 outputs a signal to the atomic scrubber circuitry 120 indicating that the data cache stages 230, 232, 234, and 236 are empty of transactions.

Based on the data cache stages 230, 232, 234, and 236 of the pipeline 117 being determined to be empty at 314 of the method 300, the method 300 proceeds to 316 of the method 300 of transactions. Further, based on a determination that the data cache stages 230, 232, 234, and 236 of the pipeline 117 are not empty of transactions, 314 of the method 300 is repeated. In one or more examples, 314 of the method 300 is repeated until the data cache stages 230, 232, 234, and 236 of the pipeline 117 are determined to be empty of transactions. In such an example, 314 of the method 300 functions as a wait for function, where the method 300 waits until the data cache stages 230, 232, 234, and 236 of the pipeline 117 are determined to be empty of transactions before the method 300 proceeds past 314 of the method 300.

At 316 of the method 300, a first address within the cache memory is selected. For example, a first address within the cache memory 118 is selected to be read by the read and write circuitry 122 of the atomic scrubber circuitry 120. The read and write circuitry 122 selects a first address within the cache memory 118 to be read based on a signal received from the processor 111 or the MMU circuitry 115 indicating that the data cache stages 230, 232, 234, and 236 of the pipeline 117 are empty of transactions. In one example, the cache memory 118 includes address 0x0-0xN. N is one or more. In such an example, the first address is address 0 of the cache memory 118.

At 318 of the method 300, the value of the selected address within the cache memory is read. For example, the read and write circuitry 122 of the atomic scrubber circuitry 120 reads the value of the selected address within the cache memory. The read and write circuitry 122 actives the chip select and clock enable signals associated with selected address of the cache memory 118 to read the value of selected address.

At 320 of the method 300, a determination is made as to whether or not single bit error is detected at the selected address. The ECC circuitry 121 receives the value of the selected memory address from the read and write circuitry 122 and determines if a single bit error exists. The ECC circuitry 121 determines if a single bit error exists through the use of a SECDED process, or a similar error detection process.

If at 320 of the method 300, a single bit error is detected, the error within the memory is fixed with correct data at 320 of the method 300. For example, the ECC circuitry 121 generates corrected data and the read and write circuitry 122 writes the corrected data to the selected address. In one example, a SECDED process, or a similar error correction process, is used to fix the error associated with the selected address.

If at 320, a single bit error is not detected at the selected address, a determination as to whether or not the last address within the cache memory has been reached is made at 324 of the method 300. In one example, the atomic scrubber circuitry 120 determines whether or not the last address within cache memory 118 has been reached. Based on a determination that the last address within the cache memory 118 has not been reached, the next (e.g., new) address of the memory is selected at 326 of the method 300. In one example, the atomic scrubber circuitry 120 increments the address selected at 316 of the method 300, selecting the next address. For example, if the currently selected address is M, at 326 of the method 300 the selected address is incremented such that address M+1 is selected. In one example, the addresses are sequentially selected to be analyzed for errors. In other examples, the address are selected in a non-sequential order to be analyzed for errors. The addresses may be selected started with a first address within a memory and working to a last address within a memory or starting from a last address within memory and working to a first address within a memory. In other examples, any address within a memory be selected, such that each address is analyzed for errors.

Based on selecting a new address at 326 of the method 300, the process of 318 of the method 300 is repeated. 318, 320, 322, 324, and 326 of the method 300 are repeated until the last address of the cache memory 118 is determined to be reached at 322 of the method 300. Accordingly, each address within cache memory 118 is analyzed for errors, and any errors that are detected are corrected. Such a process does not require the storage of an address associated with an error, reducing the memory and circuit area requirements of the corresponding processing system. In one or more examples, the method 300 analyzes each address of a memory, detecting and correcting corresponding errors within each address of the memory. In one example, a single bit error may occur at a memory address not accessed by the first half of a program, but are access by a second half of the program. In such an example, as the method 300 analyzes each address of a memory, the method 300 detects and fixes the single bit errors before the errors migrate into double bit errors.

Based on determining that a last address of the cache memory 118 has been reached, the method 300 ends at 328 of the method 300. In one example, at 328 of the method 300, the method 300 returns to 310 of the method 300, repeating the process of detecting and correcting single bit errors within a memory.

Figure 4:
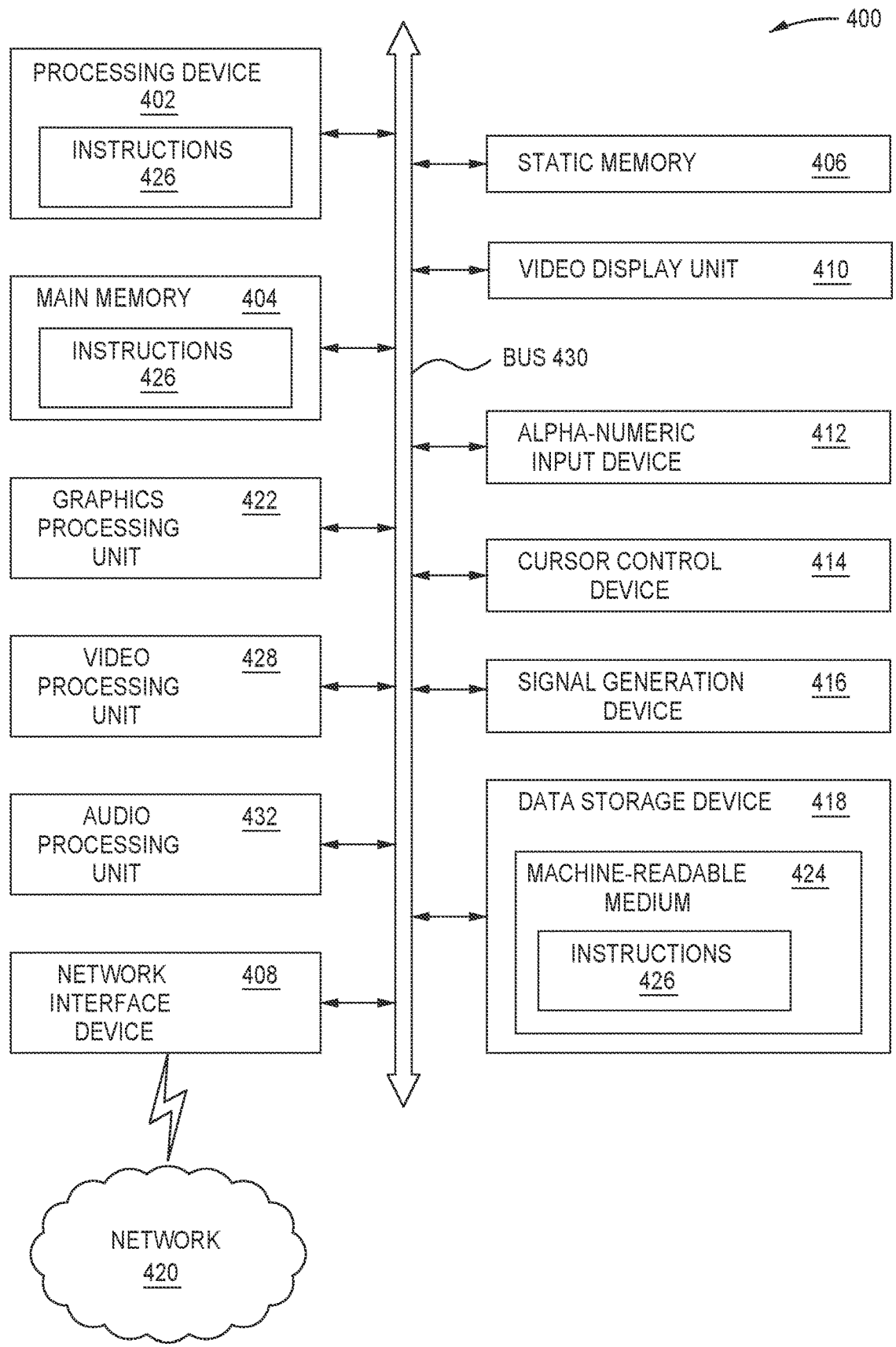
FIG. 4 depicts a diagram of an example computer system in which embodiments of the present disclosure may operate.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing system 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing system 402 represents one or more processors such as a microprocessor, a central processing unit, or the like. More particularly, the processing system may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing system 402 may also be one or more special-purpose processing systems such as an application specific integrated circuit (ASIC), a field programmable gate array (FPGA), a digital signal processor (DSP), network processor, or the like. The processing system 402 may be configured to execute instructions 426 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a non-transitory computer-readable medium) on which is stored one or more sets of instructions 426 or software embodying any one or more of the methodologies or functions described herein. The instructions 426 may also reside, completely or at least partially, within the main memory 404 and/or within the processing system 402 during execution thereof by the computer system 400, the main memory 404 and the processing system 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing system 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   detecting, by a processing device, a single bit error with a memory, wherein the memory is accessed via data cache stages of a pipeline, and comprises a plurality of addresses storing a plurality of values;
   stopping, based on detecting the single bit error, the data cache stages of the pipeline from accepting new transactions;
   selecting, based on stopping the new transactions from being accepted, each of the plurality of addresses to read a value associated with each of the plurality of addresses; and
   correcting each single bit error detected within the plurality of values.

2. The method of claim 1, wherein selecting each of the plurality of addresses to read a value associated with each of the plurality of addresses is further based on determining that the data cache stages of the pipeline are free from transactions.

3. The method of claim 1, wherein the plurality of addresses includes a first address, a second address, and a third address, and detecting the single bit error comprises detecting a single bit error associated with the first address, and wherein reading a value associated with each of each of the plurality of addresses comprises reading a first value associated with the first address, a second value associated with the second address, and a third value associated with the third address.

4. The method of claim 3 further comprising:
   determining that a single bit error exists at the first address; and
   correcting the first address based on determining that a single bit error exists at the first address.

5. The method of claim 4 further comprising:
   selecting the second address;
   determining that a single bit error exists at the second address; and
   correcting the second address, based on determining that the single bit error exists at the second address.

6. The method of claim 1 further comprising:
   determining that a first address of the plurality of addresses is free from single bit errors; and
   selecting a second address of the plurality of addresses based on determining that the first address is free from single bit errors.

7. The method of claim 1 further comprising sequentially selecting each of the plurality of addresses to be analyzed for a single bit error based on stopping the new transactions from being accepted.

8. A processing system comprising:
   a memory comprising a plurality of addresses storing a plurality of values;

a processor configured to access the memory via transactions;

a pipeline comprising data cache stages configured to execute the transactions to access the memory; and atomic scrubber circuitry configured to:
  detect a single bit error within the memory;
  select, during a first period, each of the plurality of addresses and read a value associated with each address of the plurality of addresses based on detecting the single bit error; and
  correct detected single bit errors within the plurality of values; and memory management unit circuitry configured to stop, based on detecting the single bit error, the data cache stages during the first period.

9. The processing system of claim 8, wherein the memory management unit circuitry is further configured determine that the data cache stages of the pipeline are free from transactions, and wherein selecting each of the plurality of addresses is further based on determining the data cache stages of the pipeline are free from the transactions.

10. The processing system of claim 8, wherein the plurality of addresses includes a first address, a second address, and a third address, and detecting the single bit error comprises detecting a single bit error associated with h first address, and wherein reading a value associated with each of the plurality of addresses comprises reading a first value associated with the first address, a second value associated with the second address, and a third value associated with the third address.

11. The processing system of claim 10, wherein the atomic scrubber circuitry is further configured to:
  determine that a single bit error exists at the first address; and
  correct the first address based on determining that a single bit error exists at the first address.

12. The processing system of claim 11, wherein the atomic scrubber circuitry is further configured to:
  select the second address;
  determine that a single bit error exists at the second address; and
  correct the second address, based on determining that a single bit error exists at the second address.

13. The processing system of claim 8, wherein the atomic scrubber circuitry is further configured to:
  determine that a first address of the plurality of addresses is free from single bit errors; and
  select a second address of the plurality of addresses based on determining that the first address is free from single bit errors.

14. The processing system of claim 8, wherein the atomic scrubber circuitry is further configured to:
  sequentially select each address of the plurality of addresses to be analyzed for a single bit error based on stopping new transactions from being accepted.

15. An atomic scrubber circuitry configured to:
  detect a single bit error within a memory, wherein the memory is accessed via data cache stages of a pipeline of a processor, and comprises a plurality of addresses storing a plurality of values;
  select each of the plurality of addresses to read a value associated with each of the plurality of addresses during a first period, wherein, during the first period new transactions are stopped from being accepted by the data cache stages; and
  correct each single bit error detected within the plurality of values during the first period.

16. The atomic scrubber circuitry of claim 15 is further configured to correct the detected single bit errors within the values based on a determination that the data cache stages are free from transactions.

17. The atomic scrubber circuitry of claim 15, wherein the plurality of addresses includes a first address, a second address, and a third address, and detecting the single bit error comprises detecting a single bit error associated with the first address, a second value associated with the second address, and a third value associated with the third address.

18. The atomic scrubber circuitry of claim 17 further configured to:
  determine that a single bit error exists at the first address; and
  correct the first address based on determining that a single bit error exists at the first address.

19. The atomic scrubber circuitry of claim 18 further configured to:
  select the second address;
  determine that a single bit error exists at the second address; and
  correct the second address based on determining that the single bit error exists at the second address.

20. The atomic scrubber circuitry of claim 15 further configured to:
  determine that a first address of the plurality of addresses is free from single bit errors; and
  select a second address of the plurality of addresses based on determining that the first address is free from single bit errors.

* * * * *